May 3, 1949.  C. G. SEYFERTH  2,469,279
COUPLING FOR TRACTORS AND SEMITRAILERS

Filed Nov. 21, 1946  2 Sheets-Sheet 1

INVENTOR.
Carl G. Seyferth
BY
Barnes, Kisselle, Laughlin & Raisch
ATTORNEYS.

May 3, 1949.　　　　C. G. SEYFERTH　　　　2,469,279
COUPLING FOR TRACTORS AND SEMITRAILERS
Filed Nov. 21, 1946　　　　　　　　　　2 Sheets-Sheet 2

INVENTOR.
Carl G. Seyferth
BY
Barnes, Kisselle, Laughlin & Raisch
ATTORNEYS.

Patented May 3, 1949

2,469,279

UNITED STATES PATENT OFFICE 2,469,279

COUPLING FOR TRACTORS AND SEMITRAILERS

Carl G. Seyferth, Muskegon, Mich., assignor to West Michigan Steel Foundry Company, Muskegon, Mich., a corporation of Michigan Application November 21, 1946, Serial No. 711,353

9 Claims. (Cl. 280—33.05)

This invention relates to a coupling for tractors and semi-trailers and it has to do particularly with an improved locking or latching mechanism for a coupling of the fifth wheel type.

As is well-known by those versed in the art, the so-called semi-trailer rests, at its forward end, upon a tractor through the means of a fifth wheel. Usually, the lower fifth wheel member is permanently mounted on a tractor while the upper fifth wheel member is mounted on a trailer. The improved latching or locking mechanism of the present invention resides in means on the lower fifth wheel member for establishing a connection with a king pin on the upper fifth wheel member.

Generally, the objects of the invention are to provide an improved operating mechanism by means of which the latching mechanism may be conditioned for disengagement and operable to be set into a condition for an automatic action upon re-engagement. One of the principal objects is to provide an operating mechanism which has a freedom from the impact incident to the coupling of the tractor and the semi-trailer in that the operating mechanism is pre-set and has no substantial movement, other than the movement of essential parts, for establishing the locked condition when the tractor and semi-trailer are connected. To this end there is an operating piece having a handle which the operator of the vehicle, or his assistant, may manipulate for conditioning the coupling for disconnection. Upon the completion of the disconnection, the mechanism and the handle involved automatically reset themselves and make no further movement of a substantial nature when the tractor and semi-trailer are coupled together. This makes for safety in operation, that is, safety to the person or persons operating the vehicle, or persons who may be near the vehicle and for a smooth, nicely acting mechanism. Another object of the invention is to provide a mechanism with a multiple locking arrangement to make for safety in operation. A further object of the invention is to provide a mechanism which can be manipulated by an operator at the side of the vehicle.

The invention is disclosed in the accompanying drawings wherein.

Figure 1:
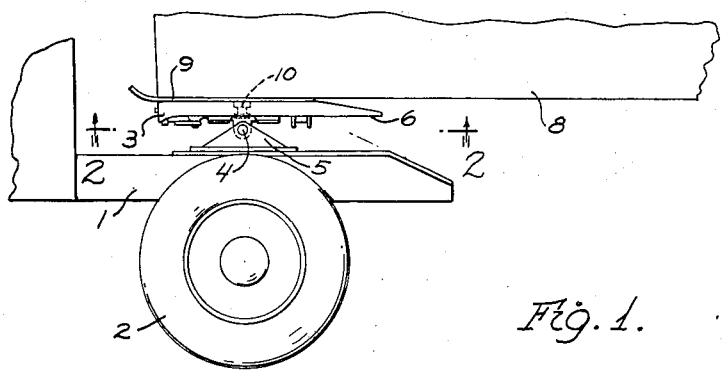
Fig. 1 is a general view showing the rear end of a tractor and the forward end of a semi-trailer coupled together by means of the fifth wheel.

As illustrated in Fig. 1, the rear end of a tractor is illustrated at 1 having traction wheels 2 which may be driven by any suitable power, and mounted on the tractor is a lower fifth wheel member generally indicated at 3. This lower fifth wheel member is pivotally mounted to the tractor as at 4 by means of brackets or standards 5. This may be and preferably is the so-called rocking fifth wheel and also it may have tail pieces 6 which provide a V-shaped guiding formation 7 for guiding the king pin into the lower fifth wheel member. The forward end of a trailer is illustrated at 8 having an upper fifth wheel member or plate 9 from which there is a depending king pin 10.

Figure 2:
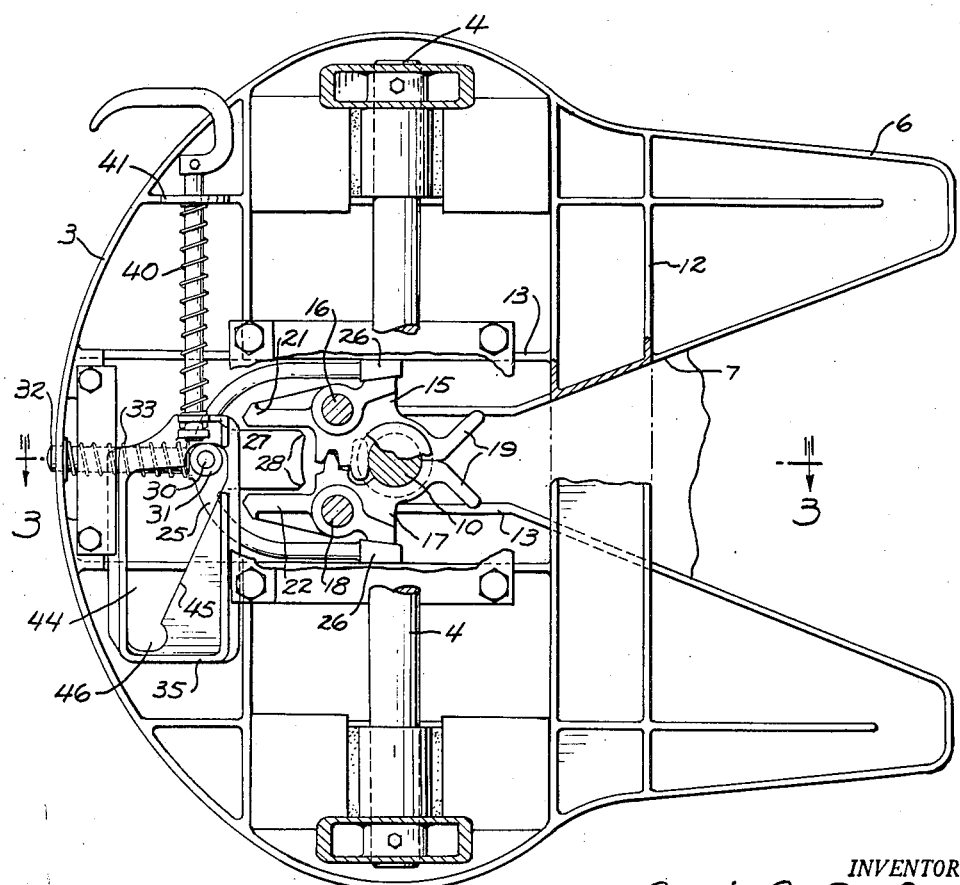
Fig. 2 is a plan view showing the under side of the lower fifth wheel and illustrating the locking and latching mechanism.
Figure 3:
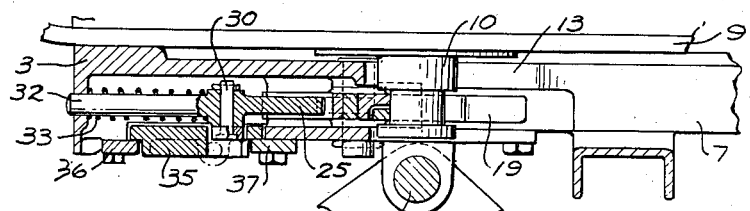
Fig. 3 is a sectional view taken substantially on line 3—3 of Fig. 2.
Figure 5:
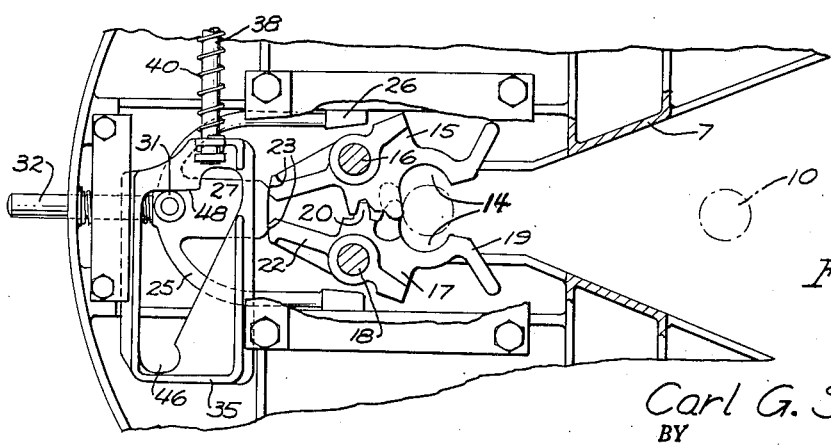
Fig. 5 is a view similar to Fig. 4 showing the parts in uncoupled relationship and ready to receive the king pin of the trailer.

The under side of the lower fifth wheel member may be provided with suitable re-enforcements 12 as shown in Fig. 2 and which include longitudinally extending walls 13. Adjacent the center of the member are mounted two locking jaws. One jaw 15 is pivotally mounted as at 16, while the other jaw 17 is pivotally mounted as at 18. The jaws are shaped to provide a socket for the king pin 10 as shown at 14, and they have diverging lips 19 for engagement with the king pin. These jaws are coupled together for rocking action in unison and for this purpose have a sort of gear tooth connection as shown at 20 (Fig. 5). Each jaw has a tail piece as shown at 21 and 22 preferably each provided with an inclined or camming surface 23.

The king pin 10 is adapted to be received in the socket provided by the jaws as shown in Fig. 2, and the jaws are held closed by a yoke 25. The yoke is slidably mounted and has wedge-shaped end portions on each end thereof as shown at 26 for wedging engagement between appropriate portions of the jaws and the walls 13 to thus hold the jaws clamped about the king pin. The yoke has an extension 27 arranged to fit between the tail pieces 21 and 22 and this extension preferably is provided with angular faces 28 for cooperation with the cam faces 23 as will presently be seen.

Mounted on the yoke is a projection or stud 30, preferably provided with a roller 31, and extending from the yoke is a rod or pin 32 slidably mounted in the fifth wheel member and a coiled spring 33 is situated between the yoke and the body of the fifth wheel member so as to urge the yoke normally projected in locked position as shown in Fig. 2.

The operating mechanism, as mentioned above, is of simple construction and comprises a controlling element 35 mounted for transverse sliding movement in guides 36 and 37. Connected to this controlling element or slide, as by means of a rod 38, is an operating handle 39, while a coiled spring 40 surrounds the rod 38 and is engaged between the slide and a reaction abutment 41. The spring 40 normally holds the slide projected as shown in Fig. 2.

The operating piece 35 has a cut out portion 44 providing an inclined plane or wedging surface 45 which is provided with a notch 46 at, what may be termed, its upper end. The stud 30 with its roller 31 is positioned in the cut out portion 44. In the normal locked position, as shown in Fig. 2, the stud and roller lie in a recess 43 of the cut out portion. The opening or cut out portion in the slide is further defined by a wall or surface 47 positioned generally opposite the inclined plane 45 and a wall or surface 48 which joins with the notch 43 and which is preferably disposed at a slight angle relative to a line parallel the true fore and aft direction through the fifth wheel.

When the tractor and semi-trailer are connected as shown in Fig. 1, the king pin 10 is connected in the socket provided by the coupling jaws 15 and 17 as shown in Fig. 2. The yoke is projected so that the wedge members 26 effectively hold the jaws clamped about the king pin; the extension 27 is projected between the tail pieces of the jaws 21 and 22 and the operating slide and its handle are projected so that the stud and its roller 31 lie in the notch 43. The extension 27, lying between the tail pieces 21 and 22, provides a secondary and safety lock which prevents the opening action of the jaws 15 and 17 should there be a failure with respect to the wedge members 26; also, a third safety is provided in that the pin 30 and its roller 31 lie in the notch 43 so that the yoke is prevented from movement to the left, as Fig. 2 is viewed. Thus the yoke cannot move toward disengaged position even though there be a failure of the spring 33.

Figure 4:
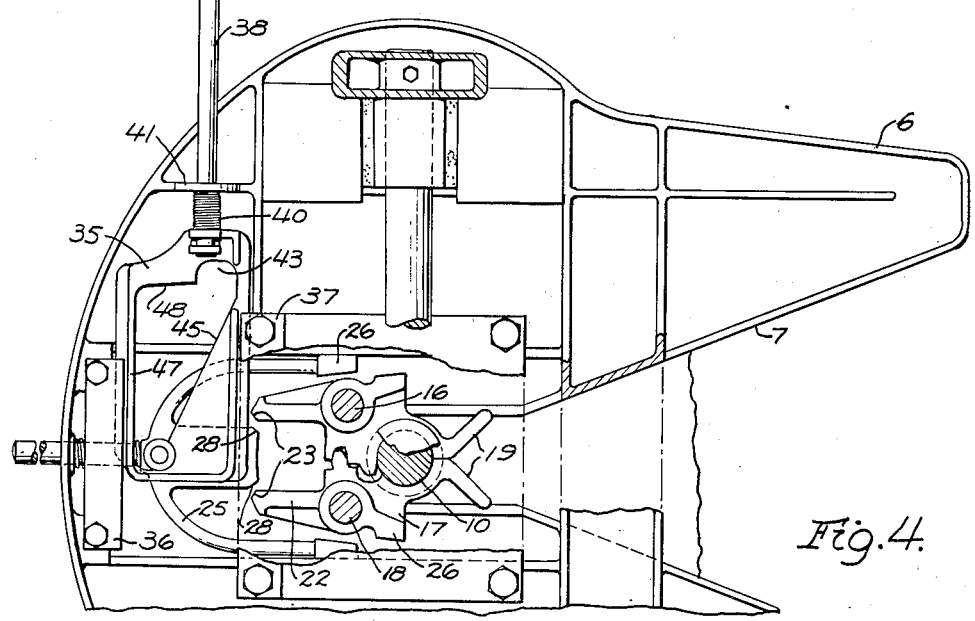
Fig. 4 is a partial view similar to Fig. 2 showing the operating mechanism set to provide for an uncoupling action.

To effect an uncoupling action, the operator grasps the handle 39 and retracts it to the position shown in Fig. 4. This can be done conveniently at the side of the vehicle by a simple pulling action. In the course of this operation, the spring 40 is compressed and the inclined plane 45 rides under the roller 31 and shifts the yoke to the left as the figures are viewed. This retracts the wedge members 26 and retracts the projection 27 relative to the tail pieces 21 and 22 of the locking jaws. This movement of the yoke compresses the spring 33 and when the operating piece 35 is fully retracted the spring 33 causes the roller 31 on pin 30 to be yieldably seated in the notch 46 at the upper end of the inclined plane. The operator may now release the handle 39 and the parts will stay in this position because of the seating of the roller 31 in the notch 46. Both springs remain compressed.

The tractor may now be moved forwardly relative to the semi-trailer and as the king pin moves out of position, the locking jaws are swung on their pivot pins 16 and 18 for disengagement. In this action, the cam faces 23 on the locking jaws engage the cam faces 28 on the extension 27 of the yoke. This, by camming action, forces the yoke into a further retracted position and moves the roller 31 out of the notch 46. Instantly the operating piece 35 and its handle shift back to a position as shown in Fig. 5 with the surface 48 abutting the roller 31. The yoke, however, is prevented from moving back to locked position because the tail pieces 21 and 22 now engage the end of the extension 27, as shown in Fig. 5. This action positively holds the locking jaws 15 and 17 in open position and as the tractor moves away from the semi-trailer, the king pin shifts out of the socket and out through the tapered guideway 7.

It will be observed that the control member 35 and the operating handle 39 has, at this time, shifted substantially completely back to locked position. There is a slight difference in position due to the difference of location of the bottom of the notch 43 and the wall 48. It will be understood that the trailer, in the uncoupling action, may lower itself from the coupled position and rest upon suitable legs (not shown) provided therefor, while the lower fifth wheel 3 may rock to the dotted line position shown in Fig. 1. When a coupling is to be made with a semi-trailer, the tractor is backed into the semi-trailer and the semi-trailer is engaged and elevated by the inclined lower fifth wheel member while the king pin 10 moves through the tapering guide way 7 and toward the socket in the center of the lower fifth wheel member. When the king pin strikes the jaws, as indicated in Fig. 5, the jaws are swung on their pivot pins so that the socket closes about the king pin; the tail pieces 21 and 22 move out from under the extension 27 and the yoke is then projected by the spring 33 from the Fig. 5 position to the Fig. 2 position and the parts are locked together. In this action, the roller 31 moves along the wall 48 and the control element 35 shifts slightly under the action of the spring 40 as the notch 43 moves over the roller 31. Accordingly, there is no large or forced movement of the slide and its handle in this coupling action and no parts swinging or moving violently which might otherwise strike and injure a person.

I claim:

1. In a fifth wheel coupling for a tractor and semi-trailer having a lower fifth wheel member with movable latch means for receiving a king pin, an upper fifth wheel member having a king pin, and locking means for locking the latch in engagement with the king pin, said locking means being shiftable to release the locking action; an operating slide having an inclined plane, a projection on the locking means engageable by the inclined plane upon operation of the slide to shift the locking means to unlocked position, means for holding the slide in shifted position and means operable upon movement of the king pin out of the latching means for releasing the slide for reverse shifting movement thereof and for engaging and holding the locking means in unlocked position.

2. In a fifth wheel coupling for a tractor and semi-trailer having a lower fifth wheel member with movable latch means for receiving a king pin, an upper fifth wheel member having a king pin, and locking means for locking the latch in engagement with the king pin, said locking means being shiftable to release the locking action; an operating slide having an inclined plane, a projection on the locking means engageable by the inclined plane upon operation of the slide to shift the locking means to unlocked position, means for holding the slide in shifted position and means operable upon movement of the king pin out of the latching means for releasing the slide for reverse shifting movement thereof and for engaging and holding the locking means in unlocked position, said means being operable upon engagement of the king pin with the latching means upon coupling action to release the locking means for movement of the same to locked position.

3. In a fifth wheel coupling for a tractor and semi-trailer having a lower fifth wheel member with movable latch means for receiving a king pin, an upper fifth wheel member having a king pin, and locking means for locking the latch in engagement with the king pin, said locking means being shiftable to release the locking action; an operating slide having an inclined plane, a projection on the locking means engageable by the inclined plane upon operation of the slide to shift the locking means to unlocked position, spring means normally holding the locking means in locked position, spring means normally holding the slide in a corresponding locked position, means for holding the slide in shifted position with both spring means compressed, means operable upon movement of the king pin out of the latching means to release the slide for movement of the same substantially back to locking position, said means being operable as the king pin engages the latching means during coupling action to release the locking means for movement, under the action of its spring means, to locked position.

4. In a fifth wheel coupling for a tractor and semi-trailer having a lower fifth wheel member with movable latch means for receiving a king pin, an upper fifth wheel member having a king pin, and locking means for locking the latch in engagement with the king pin, said locking means being shiftable to release the locking action; an operating slide member having an inclined plane with a notch at the top of the plane, a projection on the locking means engageable with the inclined plane on operation of the slide to shift the locking means to unlocked position, spring means acting upon the slide and upon the locking means, one of which serves to seat the projection in the notch, whereby the locking means and slide are interlocked in unlocked position, means operable upon shift of the king pin out of the latching means to disengage the projection from the notch for release of the slide and movement of the same substantially back to its locked position, said means being operable upon the engagement of the king pin with the latching means upon coupling to release the locking means for movement of the same to locked position.

5. In a fifth wheel coupling for a tractor and semi-trailer having a lower fifth wheel member with movable latch means for receiving a king pin, an upper fifth wheel member having a king pin, and locking means for locking the latch in engagement with the king pin, said locking means being shiftable to release the locking action; an operating slide having a cut out portion bounded by an inclined plane, a projection on the locking means disposed in the cut out portion and engageable by the inclined plane upon operation of the slide to shift the locking means to unlocked position, the cut out portion of the slide having a notch adjacent the base of the plane for engaging the projection to hold the locking means in locked position, the cut out portion having a second notch adjacent the top of the plane to engage the projection to hold both the locking means and the slide in unlocked position, means operable upon movement of the king pin out of the latching means to release the projection from the second notch and to hold the locking means in unlocked position, for movement of the slide substantially back to its locked position, said means being operable as the king pin engages the latching means during coupling to release the locking means for movement of the same to locked position, whereby the projection thereof moves to a position to be engaged by the first mentioned notch in the operating slide.

6. In a fifth wheel coupling for a tractor and semi-trailer having a lower fifth wheel member with substantially horizontally shiftable latch means and an upper fifth wheel member with a substantially vertical king pin arranged to be received in the latch means, locking means for locking the latch in engagement with the king pin and shiftable in a direction substantially at right angles to the axis of the king pin to unlock the latching means from the king pin; an operating slide shiftable in a direction substantially at right angles to the direction of shift of the locking means, said slide having a cut out portion defined by an inclined plane, a projection on the locking means positioned in the cut out portion, a notch in the cut out portion substantially at the base of the inclined plane for receiving the projection to hold the locking means in locked position, said projection being engageable by the inclined plane upon shift of the slide to move the locking means to unlocked position, a notch substantially at the top of the inclined plane for receiving the projection to hold the locking means in unlocked position and to hold the operating slide in the corresponding unlocked position, means operable upon movement of the king pin out of the latching means to hold the locking means in unlocked position and to release the projection from the second named notch for movement of the slide substantially back to locked position, said means being operable as the king pin engages the latching means during coupling to release the locking means for movement thereof to locked position with the projection moving to a position to be engaged by the first named notch in the operating slide.

7. In a fifth wheel coupling for a tractor and semi-trailer having a lower fifth wheel member with substantially horizontally shiftable latch means and an upper fifth wheel member with a substantially vertical king pin arranged to be received in the latch means, locking means for locking the latch in engagement with the king pin and shiftable in a direction substantially at right angles to the axis of the king pin to unlock the latching means from the king pin; an operating slide shiftable in a direction substantially at right angles to the direction of shift of the locking means, said slide having a cut out portion defined by an inclined plane, a projection on the locking means positioned in the cut out portion, a notch in the cut out portion substantially at the base of the inclined plane for receiving the projection to hold the locking means in locked position, said projection being engageable by the inclined plane upon shift of the slide to move the locking means to unlocked position, a notch substantially at the top of the inclined plane for receiving the projection to hold the locking means in unlocked position and to hold the operating slide in the corresponding unlocked position, spring means normally urging the locking means to locked position, spring means normally urging the operating slide to a corresponding locked position, means operable upon movement of the king pin out of the latching means to hold the locking means in unlocked position and to release the projection from the second named notch for movement of the slide substantially back to locked position, said means being operable as the king pin engages the latching means during coupling to release the locking means for movement thereof to locked position with the projection moving to a position to be engaged by the first named notch in the operating slide.

8. In a fifth wheel coupling for a tractor and semi-trailer having a lower fifth wheel member with movable latching means and an upper fifth wheel member having a king pin to be engaged by the latching means, said latching means comprising pivoted jaws with tail pieces, a locking yoke shiftable to embrace the outsides of the locking jaws to lock the same about the king pin, said yoke having an extension projectable between the tail pieces to provide a second lock for the locking jaws, a projection on the locking yoke, an operating slide shiftable in a direction substantially transverse to the direction of the shift of the yoke, said slide having a cut out portion for receiving the projection and having an inclined plane defining the cut out portion, the slide having a notch substantially at the base of the plane for engaging the projection to hold the yoke in locked position thus providing a third locking agency, said inclined plane engaging the projection to shift the yoke upon movement of the slide, means on the slide for engaging the yoke to hold the slide and yoke in unlocked position, means operable as the king pin leaves the latching means to release the intergageable means and to hold the yoke in unlocked position and means operable as the king pin engages the latching means during coupling to release the yoke for movement of the same to locked position and for movement of the projection into position to be engaged by said notch in the slide.

9. In a fifth wheel coupling for a tractor and semi-trailer having a lower fifth wheel member with movable latch means for receiving a king pin, an upper fifth wheel member having a king pin, and locking means for locking the latch in engagement with the king pin, said locking means being shiftable to release the locking action; an operating slide mounted for sliding movement transversely of the tractor and semi-trailer and having an operating handle accessible to an operator at the side of the tractor and semi-trailer, the operating slide and the locking means having, one an inclined plane and the other a projection engageable with the inclined plane to move the locking means to unlocked position upon transverse sliding movement of the operating slide, means for holding the operating slide in its shifted position, and means operable upon movement of the king pin out of the latching means for releasing the operating slide for reverse shifting movement thereof, and for engaging and holding the locking means in unlocked position.

CARL G. SEYFERTH.

REFERENCES CITED

The following references are of record in the file of this patent:

UNITED STATES PATENTS

| Number | Name | Date |
| --- | --- | --- |
| 1,999,375 | Seyferth et al. | Apr. 30, 1935 |
| 2,294,710 | Berg et al. | Sept. 1, 1942 |